United States Patent [19]
DeWit

[11] Patent Number: 5,295,091
[45] Date of Patent: Mar. 15, 1994

[54] ANALOG IMPLEMENTATION OF A PATTERN CLASSIFIER

[75] Inventor: Michiel DeWit, Dallas, Tex.

[73] Assignee: Texas Instruments Incorporated, Dallas, Tex.

[21] Appl. No.: 748,605

[22] Filed: Aug. 22, 1991

[51] Int. Cl.$^5$ ............................................... G06G 7/00
[52] U.S. Cl. ........................................ 364/807; 395/27
[58] Field of Search ......................... 364/807; 395/27; 307/201

[56] References Cited

U.S. PATENT DOCUMENTS 5,140,531 8/1992 Engeler ............................. 395/27 X Primary Examiner—Tan V. Mai Attorney, Agent, or Firm—Richard A. Stoltz; James C. Kesterson; Richard L. Donaldson

[57] ABSTRACT

A method of and system for classifying a pattern wherein there is provided a node, the negative of a predetermined threshold signal is applied to the node, a plurality of digital signals in parallel, is provided the digital signals are converted to analog signals, the analog signals are applied to the node to provide a summation of the analog signals and the threshold signal on the node and a predetermined output is provided if the signal at the node is above a predetermined value. This provides the transfer of a weighted pattern to the threshold without addressing each threshold element individually.

16 Claims, 3 Drawing Sheets

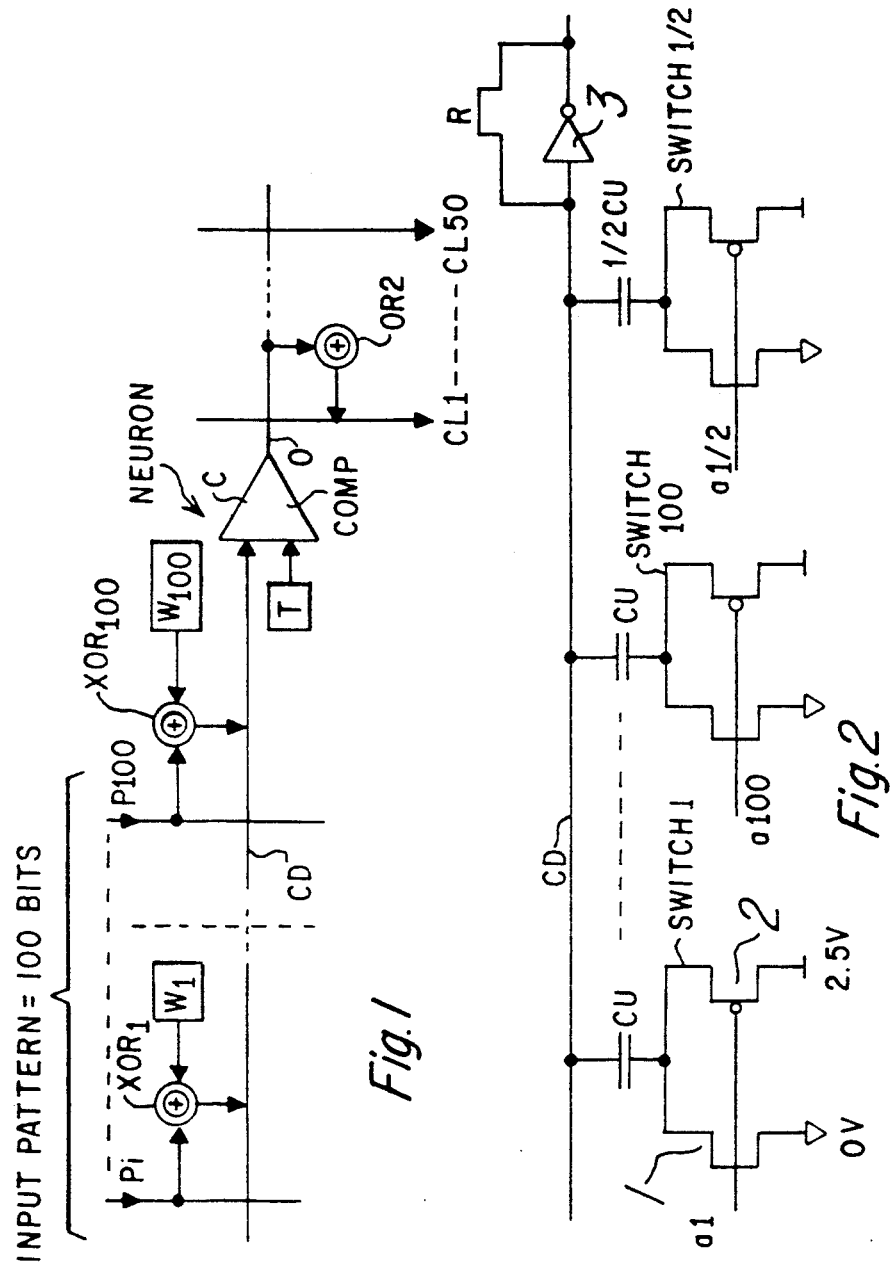

ANALOG IMPLEMENTATION OF A PATTERN CLASSIFIER

BACKGROUND OF THE INVENTION

1. Field of the Invention

This invention relates to a method and system for computing the Hamming distance between two vectors in an N-dimensional space with binary components and to a method and system for comparing the Hamming distance with a preselected value and a method of changing the pre-selected value, if found to be too small, with a single digital command.

2. Brief Description of the Prior Art

Architecture for a complete pattern classifier has been developed by Nestor Learning Systems and is set forth in "Neural Network Algorithms and Implementations" by Dean R. Collins et al., Texas Instruments Incorporated, "Pattern Class Degeneracy In An Unrestricted Storage Density Memory" by Christopher L. Scofield et al., Nestor, Inc., American Institute of Physics, 1988, pages 674 to 682, "Learning System Architectures Composed of Multiple Learning Modules" by Douglas L. Reilly et al., Nestor Inc., pages II-495 to II-503 and "Learning Systems Based on Multiple Neural Networks", copies of which are attached hereto and the contents of which are incorporated herein by reference. However, though the mathematics for the Nestor architecture has been developed, there is no known prior art which implements this architecture in an integrated circuit. It is apparent that a full digital implementation of the mathematics embodying the Nestor architecture has the disadvantage that the Hamming distance must be computed with some type of digital adder, such as a counter, and many N clock cycles are required to compute the required sum, where N is the pattern space dimension which could be 100 or more. The requirement of the many N clock cycles results in the necessity of a relatively high clock rate of N times the pattern rate. Also, the number of components required is relatively large, therefore resulting in a relatively large chip and the concomitant relatively high power consumption. It is therefore apparent that an integrated circuit embodiment of the Nestor architecture which operates with relatively low power consumption, yet operates at sufficiently high speed to perform the classification logic, is highly desirable.

SUMMARY OF THE INVENTION

In accordance with the present invention, the above noted problem is minimized and there is provided an integrated circuit embodying the Nestor architecture which provides the desired relatively low power consumption and which operates at sufficiently high speed to perform the classification logic.

Briefly, there is provided a method of computing the Hamming distance between two vectors in an N dimensional space with binary components, a method to compare this Hamming distance with a pre-selected value and a method to change this pre-selected value, if too small, with a single digital command. The method is implemented with a special integrated circuit in such a way that all of the inputs to the circuit and all of the outputs from the circuit are the usual digital (binary) signals encountered in logic integrated circuits. Internal to the circuit the computations are performed in the analog domain. This provides for a smaller chip and permits the computation of the Hamming distance and its comparison with a pre-selected value (the threshold) in one period of a four phase clock. The updating of the threshold, when required or desired, is performed in one additional clock period. The method herein is applicable in general whenever a large number of bits must be added and their sum compared to another number.

In accordance with a preferred embodiment of the invention, an N bit (e.g., N=100) incoming signal pattern is transmitted in parallel to N exclusive OR (XOR) gates, each exclusive OR gate having a unique previously stored bit value as a second input. Each exclusive OR gate charges or does not charge a capacitor, based upon whether or not there is a match of the stored bit signal and the incoming bit signal. An addition is then performed by discharging those capacitors that connect to a one bit of the threshold word. The potential of the common node of all the capacitors is tested by determining whether the potential on the node is greater than or less than some predetermined reference value previously placed on the node and inverted in polarity. In the digital mode, this addition would have to be accomplished sequentially. The only result sought is to determine whether or not the number of charged capacitors or sum is greater than the reference value.

BRIEF DESCRIPTION OF THE DRAWINGS

FIG. 1 is a block diagram of a preferred embodiment of an analog implementation of a pattern classifier in accordance with the present invention;

FIG. 2 is a circuit diagram of the capacitor charging and discharging circuitry in accordance with the present invention;

DESCRIPTION OF THE PREFERRED EMBODIMENT

Figure 3:
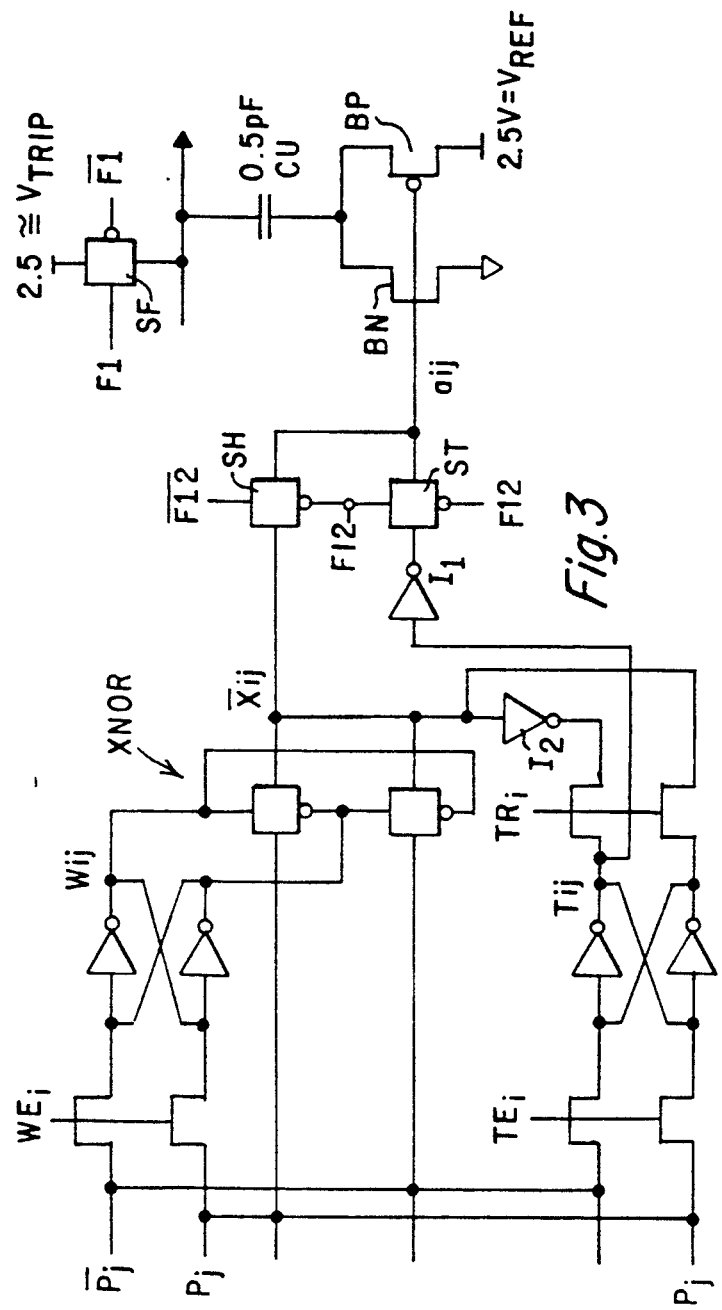
FIG. 3 is a circuit diagram for providing the signals $a_1$ through $a_{100}$ of FIG. 2.
Figure 4:
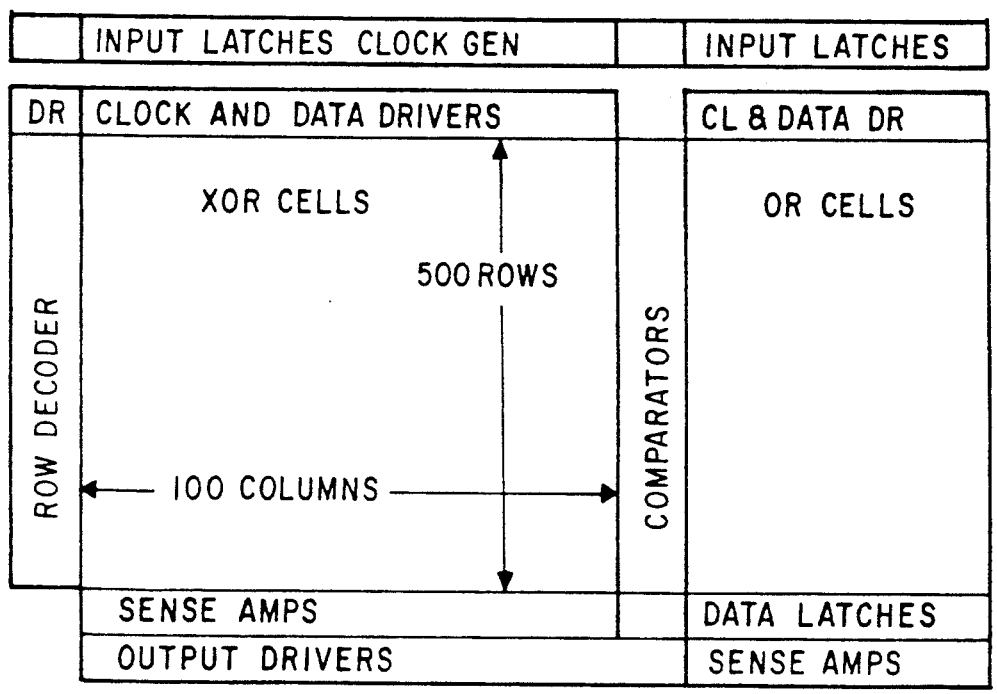
FIG. 4 is a block diagram of a complete integrated circuit in accordance with the present invention.

Referring first to FIG. 4, there is shown a block diagram of a complete integrated circuit in accordance with the present invention showing the blocks of the various cells, most but not all of which are discussed in detail with reference to FIGS. 2 and 3. The blocks, in general, such as the input latches, clock generator, clock and data drivers, row decoder, sense amplifiers, output drivers, and data latches relate to standard digital circuitry which is well known. Accordingly, this circuitry will not be discussed in detail herein except as required to explain the inventive portion of the circuit.

Referring now to FIG. 1, which is one of the rows in the blocks XOR cells, comparators and OR cells of FIG. 4, there is shown a block diagram of a preferred embodiment of the present invention which comprises a portion of the integrated circuit of FIG. 4. There are shown 100 input lines $P_1$ to $P_{100}$, each input line being an input to one of one hundred exclusive OR gates $XOR_1$ to $XOR_{100}$. Each of the exclusive OR gates $XOR_1$ to $XOR_{100}$ has a second input thereto which is a unique stored bit stored in a storage element $W_1$ to $W_{100}$. When the input signal on an input line $P_1$ to $P_{100}$ matches with the signal stored in the associated storage element $W_1$ to $W_{100}$, a capacitor associated with that gate is charged up (to be explained hereinbelow). A subsequent clock signal phase then causes each of the capacitors to simultaneously dump their charge (if there is one thereon) onto a common node CD to charge up that node to a level based upon the number of capacitors that had previously been charged up due to a match. The sum of the outputs of the gates $XOR_1$ to $XOR_{100}$ is the Hamming distance H between P and W.

The signal represented by the charge on the node CD is fed to a comparator C. The comparator C contains a second input T which is a storage member having an adjustable threshold. When the signal on the line CD exceeds the threshold at input T, the comparator C provides a signal to that effect on the output line O from the comparator which connects to one or more of the output lines $CL_1$ to $CL_{50}$ via an OR gate $OR_2$.

It should be understood that the circuit of FIG. 1 can include a plurality of parallel common nodes CD, each such common node coupled to the input lines $P_1$ to $P_{100}$ via exclusive OR gates such as those described hereinabove, but with associated storage elements W having the same or different signals stored therein as the other corresponding storage elements coupled to the same input line. Each of the common nodes CD would be coupled to its own comparator C, each comparator C having the same or a different threshold input T. Also, the output line O of each of the comparators C is coupled to one or more of the output lines $CL_1$ to $CL_{50}$ via an OR gate such as gate $OR_2$.

Referring now to FIG. 2, the operation of the analog portion of the circuit of FIG. 1 and the threshold will be explained. Initially the feedback switch R is closed, forcing the input CD of the inverter 3 to be equal to its output voltage. This voltage value is referred to as $V_{trip}$ and would typically be set at one half the supply voltage by proper sizing of the transistors in the inverter 3. At this same time, the bottom plates of the capacitors Cu are connected to ground (0 volts) or $V_{ref}$ (near 2.5 volts if a 5 volt supply is used, for example). The signals $a_1$ to $a_{100}$ which control this connection via switches 1 to 100 and switch ½ which is controlled by signal $a_{1/2}$ are in turn determined by the 100 stored threshold bits in threshold latches $T_1$ to $T_{100}$ similar to the W latches of FIG. 1, and switch ½ is controlled as explained below.

A one bit in the latch T causes the bottom plate of the associated capacitor Cu to be connected to $V_{ref}$ or 2.5 volts and a 0 bit causes that bottom plate to be connected to 0 volts. After the charge flow has equilibrated, switch R is opened so that node CD is floating at $V_{trip}$. By way of explanation of the operation, an intermediate step is now included where all the bottom plates are connected to ground, 0 volts by operation of signals $a_1$ to $a_{100}$. In practice, this step is not required. Assuming, for illustration, that "N" threshold bits are 1 bits and thus 100 - N are 0 bits, the voltage on node CD will then change from $V_{trip}$ to $V_{trip}-N*Cu/(100.5*Cu+C_s)$ from elementary circuit theory. The factor 100.5 comes from the total capacitance of the 100 equal capacitors Cu, plus an additional ½ Cu, whose function will be explained hereinbelow, plus $C_s$ the stray capacitance from node CD to ground.

At the next stage of the operation, the signals $a_1$ to $a_{100}$ are controlled by the exclusive-or gate outputs of FIG. 1 by conventional digital switching circuitry. The number of outputs that are 1's is the Hamming distance between the input vector P and the weight vector W in the row under consideration. Those outputs that are 1 will cause the bottom plate of those capacitors Cu associated therewith to be connected to $V_{ref}$; those that are 0 will keep the bottom plates connected to ground, 0 volts. Assuming that H outputs are 1 and therefore 100−H are at 0, the consequent switching of the bottom plates of the capacitors Cu will cause the voltage on node CD to change from its last value to $V_{trip}-N*Cu/(100.5*Cu+C_s)+H*Cu/(100.5*Cu+C_s)$.

Depending upon whether N is larger or smaller than H, the voltage on node CD will be less than or greater than $V_{trip}$. The output of inverter 3 will then go toward logic 1 or logic 0. Subsequent inverter stages, not shown in FIG. 2, will convert this signal to full logic levels. The outputs of these amplifying inverters are typically stored in a latch which is part of the comparator circuitry and then processed via the OR gates $OR_2$ shown in FIG. 1 and the result brought to the output pins $CL_1$ to $CL_{50}$ of the circuit.

The case when N is equal to H provides an indeterminate output from the comparator C, this being undesirable. This comparator output could go either to logic 1 or logic 0, depending upon small differences in the capacitors Cu or small noise voltages that inevitably are added to node CD. In order to prevent this situation from arising, the threshold is always increased from N to N+½ by switching the capacitor ½ Cu from $V_{ref}$ to 0 volts after switch R has been opened. The Hamming distance H therefore has to exceed the threshold N by one unit in order for the comparator C to provide a logic 0 output.

The comparator C as described herein as a series of inverting stages and terminating in a latch and the ½ unit offset of a signal are well known techniques used in charge redistribution analog to digital converters.

Among the various learning modes of the whole neural network, one can be easily implemented with the circuits described herein. In this mode, a test pattern is presented to the inputs $P_1$ to $P_{100}$ and the comparator C output is required to be logic 1. This state is detectable at the output pins $CL_1$ to $CL_{50}$. If the proper state is not obtained, the threshold T in each row is changed so that the proper state is obtained. The easiest way to do this, row by row, is to change the threshold stored bits $T_1$ to $T_{100}$ to the value of the outputs of $XOR_1$ to $XOR_{100}$ respectively. This replaces N in the above example with H and the threshold becomes H+½, which is larger than H, as required. Each row must be activated separately in this process.

A detailed circuit in CMOS technology that will perform all of the above described operations is shown in FIG. 3. There is shown the circuit associated with one capacitor Cu in one row of the entire neural network. One of the buffered inputs $P_j$ and its complement $NP_j$ are bussed through the jth cell in each row. The cell in the ith row contains a latch $W_{ij}$ for the weight bit. The latch is composed of two cross coupled inverters, with the inputs of the inverters connected to inputs $P_j$ and $NP_j$ via NMOS transistors that can be turned on by write signal $WE_i$ on their gates. The write signal $WE_i$ is common to all these latches in row i. Not shown is a decoder whose input is the number i and a signal WE so that only row i is selected and all j inputs to all the latches $W_{ij}$ are then connected to inputs $P_j$ and $NP_j$ and this data is transferred to the latches. This is standard digital circuitry as is used in static random access memories for writing data into memory. This circuitry is repeated for a second latch $T_{ij}$ which will store the threshold value and can be written into from inputs $P_j$ and $NP_j$ with an externally provided control signal TE and the row address i. The weights and threshold values can therefore be entered into this network via the inputs $P_1$ to $P_{100}$ in a row by row fashion, analogous to writing data into static random access memory. Additional circuitry can be added to the bus lines $P_j$ and $NP_j$ so that the values of the bits in a particular row can be retrieved and brought to output pins in exactly the same way as the read is performed in a static random access memory.

During normal operation, a signal pattern $P_1$ to $P_{100}$ is presented to the circuit. At the jth cell in the ith row, the complement of $NX_{ij}$ of the exclusive or of input $P_j$ and weight signal $W_{ij}$ is generated by the XNOR gate in FIG. 3. This XNOR gate can most simply be two CMOS transmission gates as shown.

The operation of the cell is controlled by a four phase clock. During phase 1, the common capacitor node CD is connected to a voltage source close to $V_{trip}$ (shown as 2.5 volts in FIG. 3, where a 5 volt supply digital CMOS process is assumed) by a CMOS transmission gate SF for fast charging of the node CD to a value close to $V_{trip}$. Switch R in FIG. 2 is closed. CMOS transmission gate ST is closed an SH is open. The signal $A_{ij}$ that controls the voltage on the bottom plate of the capacitor Cu, via the transistors BN and BP, is the value of the complement of the threshold bit stored by $T_{ij}$ and is buffered by inverter I1. If the threshold bit is a logic 1, then the bottom plate of capacitor Cu will be connected to $V_{ref}$, otherwise it is connected to 0 volts. The signal $A\frac{1}{2}$ in FIG. 2 is at logic 0.

During phase 2 of the clock, transmission gate SF is opened and node CD will now fully charge to the voltage $V_{trip}$ by the current supplied by the comparator C shown in FIG. 2.

During clock phases 3 and 4, switch R in FIG. 2 is opened, switch ST is opened and switch SH is closed. The signal $A_{ij}$ now becomes the output of $NX_{ij}$ of the XNOR gate. The bottom plate of capacitor Cu is connected to $V_{ref}$ if this signal is logic 0, otherwise it is connected to 0 volts. The signal $A\frac{1}{2}$ in FIG. 2 is taken to logic 1. The input pattern $P_1$ to $P_{100}$ must be valid. At the end of clock phase 4 the output of the comparator is stored in a latch.

The inverter I1 isolates the latch $T_{ij}$ from signal transients that might change its stored data, during the transition from phase 2 to phase 3. The latch $T_{ij}$ also has a second set of inputs controlled by signal $TR_i$. This input $TR_i$, when activated by the row decoder and an additional input TR, will cause the data in latch $T_{ij}$ to be changed to the complement of the value of $X_{NOR}$ output $X_{ij}$ and it becomes the new threshold value. The threshold is thus changed to the Hamming distance between the input pattern $P_1 \ldots P_{100}$ and weight $W_{i1} \ldots W_{i100}$. This threshold change is used in the learning mode as described hereinabove.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modification.

I claim:

1. A method of classifying a pattern comprising the steps of:
   (a) providing a node;
   (b) applying the negative of a predetermined threshold signal to said node;
   (c) providing a plurality of digital signals in parallel;
   (d) converting said digital signals to analog signals;
   (e) applying said analog signals to said node to provide a summation of said signals and said threshold signal on said node; and
   (f) providing a predetermined output if the signal at said node is above a predetermined value.

2. The method of claim 1 further comprising the step of weighting said digital signals after step (c).

3. The method of claim 1 wherein said step of converting comprises the steps of providing a capacitor associated with each of said digital signals, charging said capacitors individually in response to the said digital signals associated therewith and disposing said charge on said capacitors onto said node.

4. The method of claim 2 wherein said step of converting comprises the steps of providing a capacitor associated with each of said digital signals, charging said capacitors individually in response to the said digital signals associated therewith and disposing said charge on said capacitors onto said node.

5. The method of claim 1 wherein said step (a) comprises the steps of providing a plurality of capacitors coupled to said node, applying a predetermined unique charge to each of said plurality of capacitors and then applying a reference voltage to the plate of said capacitor remote from said node to reverse the polarity of the signal on said node relative to said reference voltage.

6. The method of claim 2 wherein said step (a) comprises the steps of providing a plurality of capacitors coupled to said node, applying a predetermined unique charge to each of said plurality of capacitors and then applying a reference voltage to the plate of said capacitor remote from said node to reverse the polarity of the signal on said node relative to said reference voltage.

7. The method of claim 3 wherein said step (a) comprises the steps of providing a plurality of capacitors coupled to said node, applying a predetermined unique charge to each of said plurality of capacitors and then applying a reference voltage to the plate of said capacitor remote from said node to reverse the polarity of the signal on said node relative to said reference voltage.

8. The method of claim 4 wherein said step (a) comprises the steps of providing a plurality of capacitors coupled to said node, applying a predetermined unique charge to each of said plurality of capacitors and then applying a reference voltage to the plate of said capacitor remote from said node to reverse the polarity of the signal on said node relative to said reference voltage.

9. A system for classifying a pattern comprising:
   (a) a node;
   (b) circuitry for applying the negative of a predetermined threshold signal to said node;
   (c) circuitry for providing a plurality of digital signals in parallel;
   (d) circuitry for converting said digital signals to analog signals;
   (e) circuitry for applying said analog signals to said node to provide a summation of said signals and said threshold signal on said node; and
   (f) circuitry for providing a predetermined output if the signal at said node is above a predetermined value.

10. The system of claim 9 further comprising means to weight said digital signals.

11. The system of claim 9 wherein said means to convert comprises a capacitor associated with each of said digital signals, means to charge said capacitors individually in response to the said digital signals associated therewith and means to dispose said charge on said capacitors onto said node.

12. The system of claim 10 wherein said means to convert comprises a capacitor associated with each of said digital signals, means to charge said capacitors individually in response to the said digital signals associated therewith and means to dispose said charge on said capacitors onto said node.

13. The system of claim 9 further including a plurality of capacitors coupled to said node, means applying a predetermined unique charge to each of said plurality of capacitors and means applying a reference voltage to the plate of said capacitor remote from said node to reverse the polarity of the signal on said node relative to said reference voltage.

14. The system of claim 10 further including a plurality of capacitors coupled to said node, means applying a predetermined unique charge to each of said plurality of capacitors and means applying a reference voltage to the plate of said capacitor remote from said node to reverse the polarity of the signal on said node relative to said reference voltage.

15. The system of claim 11 further including a plurality of capacitors coupled to said node, means applying a predetermined unique charge to each of said plurality of capacitors and means applying a reference voltage to the plate of said capacitor remote from said node to reverse the polarity of the signal on said node relative to said reference voltage.

16. The system of claim 12 further including a plurality of capacitors coupled to said node, means applying a predetermined unique charge to each of said plurality of capacitors and means applying a reference voltage to the plate of said capacitor remote from said node to reverse the polarity of the signal on said node relative to said reference voltage.

* * * * *